(12) United States Patent
Crowe

(10) Patent No.: US 7,667,850 B2
(45) Date of Patent: Feb. 23, 2010

(54) IMAGING SYSTEM WITH LOW COHERENCE LIGHT SOURCE

(75) Inventor: Devon G. Crowe, Tucson, AZ (US)

(73) Assignee: Raytheon Corporation, Waltham, MA (US)

( * ) Notice: Subject to any disclaimer, the term of this patent is extended or adjusted under 35 U.S.C. 154(b) by 12 days.

(21) Appl. No.: 11/756,648

(22) Filed: Jun. 1, 2007

(65) Prior Publication Data

US 2008/0297804 A1 Dec. 4, 2008

(51) Int. Cl.
*G01B 11/02* (2006.01)

(52) U.S. Cl. ....................................... 356/497

(58) Field of Classification Search ................. 356/479, 356/497

See application file for complete search history.

(56) References Cited

U.S. PATENT DOCUMENTS

| | | | | | |
|---|---|---|---|---|---|
| 5,268,738 | A | * | 12/1993 | Baney et al. | 356/479 |
| 5,909,279 | A | * | 6/1999 | Pepper et al. | 356/479 |
| 6,980,299 | B1 | * | 12/2005 | de Boer | 356/497 |
| 2005/0083536 | A1 | * | 4/2005 | Fouquet | 356/512 |

OTHER PUBLICATIONS

Gill, David Dennis, "Precision Replication of Co-Molded Meso and Micro Optics Through Injection Molding", Ph.D. Dissertation, North Carolina State University, (2002).

"The Optical Replication Process", Spectrum Scientific, Inc., (Jun. 2005), [retrieved on Feb. 21, 2008], <http://www.ssioptics.com/replicationprocess.html>.

"Custom VPH Gratings", Kaiser Optical Systems, Inc., A Rockwell Collins Company, [retrieved on Jun. 4, 2007], <http://www.kosi.com/gratings/custom/index.html>.

Tremblay, Eric J. et al., "Ultrathin cameras using annular folded optics", Applied Optics, (2007), vol. 46, Issue 4, pp. 463-471.

"Optical Coherence Tomography", Wikipedia, [retrieved on Mar. 21, 2007], <http://en.wikipedia.org/wiki/Optical_coherence_tomography>.

Chen, Tian-Jie et al., "Graded-reflectivity mirror based on a volume phase hologram in a photopolymer film", Applied Optics, (1998), vol. 37, No. 28, pp. 6603-6608.

Juberts, Maris et al., "Status report on next generation LADAR for driving unmanned ground vehicles" Proceedings of SPIE, (2004), vol. 5609, pp. 1-12.

(Continued)

*Primary Examiner*—Michael A Lyons
(74) *Attorney, Agent, or Firm*—Renner, Otto, Boisselle & Sklar, LLP

(57) ABSTRACT

An imaging system uses a low coherence light source to image objects at a relatively far distance (at least 10 cm) and/or of a relatively large size (having a dimension of at least 10 cm). An imaging plane is located such that its image path is substantially equal to a reference path that the light follows within the imaging device. The imaging plane has a thickness of about the coherence length of the light. Only light returning from the imaging plane forms part of the image. Light returning on other paths is effectively negated due to a lack of coherence. The imaging plane may be a fixed distance from the imaging system. Alternatively, the imaging plane may be at a variable distance from the imaging system, with the reference path having a changeable length.

19 Claims, 3 Drawing Sheets

OTHER PUBLICATIONS

Banakh, V.A. et al., "Wind velocity profile reconstruction from intensity fluctuations of a plane wave propagating in a turbulent atmosphere", Optics Letters, (2007), vol. 32, No. 15.

Arns, James A. et al. "Volume phase gratings for spectroscopy, ultrafast laser compressors, and wavelengh division multiplexing", Current Development in Optical Design and Optical Engineering VIII, (1999), vol. 3779, pp. 313-323.

Baharav, Yael et al., "Wave-front sensing by pseudo-phase-conjugate interferometry", Applied Optics, (1995), vol. 34, No. 1, pp. 108-113.

Djordjevic, Ivan et al., "LDPC coded OFDM over the atmospheric turbulence channel", Optics Express, (2007), vol. 15, No. 10, pp. 6336-6350.

Barden, Samuel C. et al., "Volume-phase holographic gratings and their potential for astronomical applications", Proceedings of SPIE, (1998), vol. 3355, pp. 866-876.

"Origami Lens Slims High Resolutions Cameras", Jacobs School of Engineering: News & Events, [retrieved on May 11, 2007], <http://www.jacobsschool.ucsd.edu/news/news_releases/release.sfe?id=617>.

* cited by examiner

IMAGING SYSTEM WITH LOW COHERENCE LIGHT SOURCE

BACKGROUND OF THE INVENTION

1. Technical Field of the Invention

The invention is in the field of imaging.

2. Description of the Related Art

Time-of-flight ladar systems with conventional optics have been used to provide three-dimensional imaging at high resolution and at long range. However, such systems are expensive, operate only with great complexity, and are susceptible to interference and counter measures. It will be appreciated, therefore, that improvements are desirable.

SUMMARY OF THE INVENTION

In accordance with an aspect of the invention, optical coherence interferometry, rather than time of flight, is used in imaging at a distance.

According to another aspect of the invention, an imaging system using optical coherence interferometry may achieve resolutions of 1 mm or less at very long ranges, such as ranges from 10 cm to as much as 20 km in the atmosphere, or essentially unlimited range in a vacuum.

According to yet another aspect of the invention, an imaging system includes: a low-coherence light source; a delay line; a mirror; an imager; and a beam splitter. The beam splitter is placed in a light path of light from the light source, dividing the light into an outgoing light portion and a reference light portion. The outgoing light portion is directed toward an object to be imaged. At least part of return light from the object is directed by the beam splitter to the imager. The reference light portion passes through the delay line and is reflected by the mirror to the imager.

According to still another aspect of the invention, a method of imaging an object includes the steps of: directing an outgoing light portion of low-coherence light from an imaging system toward an imaging plane; routing a reference light portion of the low-coherence light through a reference path within the imaging system; and directing to an imager of the system both the reference light portion and return light produced by one or more objects in a light path of the outgoing light portion. The imaging plane is located at a distance away from the imaging system that corresponds to a reference path length of the reference path. The imaging plane is at least 10 cm away from the imaging system. The imaging plane has a depth on the order of a coherence length of the low-coherence light.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

Figure 1:
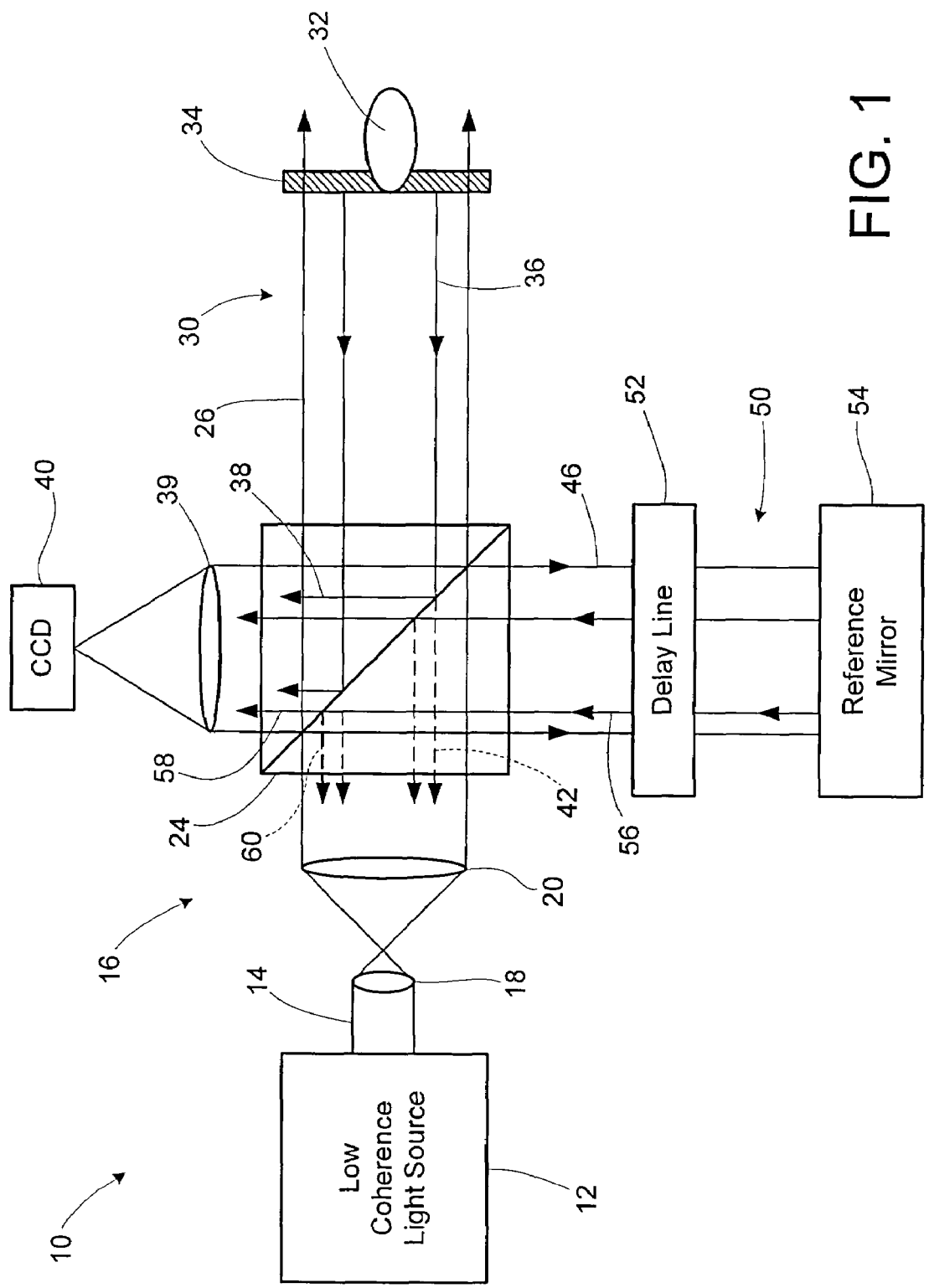
FIG. 1 is a schematic diagram of an imaging system in accordance with an embodiment of the present invention.

An imaging system uses a low coherence light source to image objects at a relatively far distance (at least 10 cm) and/or of a relatively large size (having a dimension of at least 10 cm). The imaging system uses a beam splitter to divert some of the light from the light source to a reference light path that has substantially the same length as an imaging light path between imaging system and an imaging plane where imaging of a target object takes place. The beam splitter directs some of the light from the light source through a reference light path, and to an imager such as a charge-coupled device (CCD). The beam splitter also directs a return image, from the imaging plane, to the imager. Low coherence light from the light source has a relatively low coherence length. The imaging plane is located such that its image path is substantially equal to a reference path that the light follows within the imaging device. The imaging plane has a thickness of about the coherence length of the light. Only light returning from the imaging plane forms part of the image. Other light returning to the imaging system, light from outside the imaging plane, makes no appreciable contribution to the image recorded by the imaging system. Light returning on other paths is effectively negated due to a lack of coherence. Light paths that do not contribute to the image may be longer or shorter than the path to and from the imaging plane. The imaging plane may be a fixed distance from the imaging system. Alternatively, the imaging plane may be at a variable distance from the imaging system, with the reference path having a changeable length. The length of the reference path may be altered by moving a mirror used to reflect a reference portion of light at one end of the reference path. The reference path may also have a delay line therein, including a fiber optic device or a set of mirrors. The delay line may provide a variable delay, shifting the amount of delay involved in light traveling therethrough.

The imaging system may also include magnifying optics. The magnifying optics allow imaging of objects much larger than the beam splitter and other components of the imaging system. The imaging system may be capable of imaging objects that have a dimension of 10 cm or more within the imaging plane. The imaging system may be capable of imaging objects at relatively long ranges, with the imaging plane at least about 10 cm away from the imaging system. The imaging system may be capable of providing three-dimensional imaging, using relative movement between the imaging system and the object to rapidly image in successive planes. This may be used to build a three-dimensional image of an object with complex topography, such as a human face. Possible applications of such systems include: face recognition, aircraft safety inspection, obscurant penetration since only "ballistic" photons contribute to the image, digitizing large prototypes, infrastructure inspection including buildings, bridges, highways, towers, etc., and space Situational Awareness.

Figure 2:
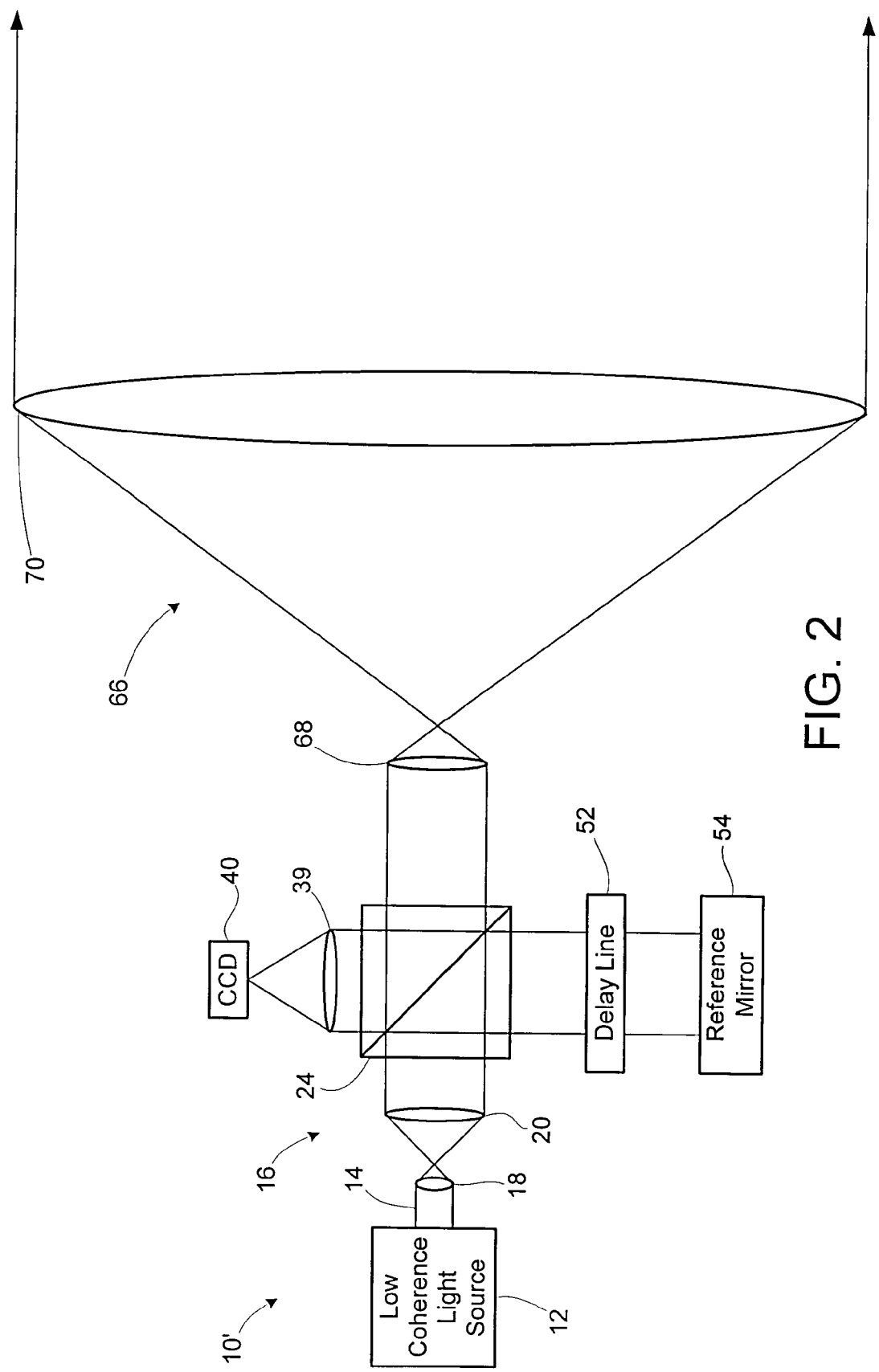
FIG. 2 is a schematic diagram of an alternate embodiment imaging system according to the present invention.

Referring initially to FIGS. 1 and 2, an imaging system 10 includes a low coherence light source 12. The light source 12 may have a coherence length, a length over which most of the light is coherent. The coherence length may be on the order of 1 mm, although it will be appreciated that other suitable coherence lengths may be used. Light 14 from the light source 12 passes through optics 16 in order to increase the size of the light beam. The optics 16 includes a first lens 18 and a second lens 20. The light 14 then encounters a beam splitter 24 that is angled at a 45-degree angle to the path of the light 14. A beam splitter 24 is a half-silvered structure that reflects part of incident light, while allowing another part of the incident light to pass through. The beam splitter 24 allows a first portion 26 of light to pass straight through. The first portion 26 proceeds along an imaging light path 30 toward an object 32 to be imaged. At least part of the object 32 is located in an imaging plane 34. The first light portion 26 produces a return image 36 that travels back along the imaging light path 30.

When the return image 36 reaches the beam splitter 24, an image portion 38 is reflected through an imaging focus lens 39, and toward an imager 40. Another portion of the return image 36 is a discarded image portion 42 that passes through the beam splitter 24. The discarded image portion 42 plays no further role.

A second portion 46 of the light 14 is reflected by the beam splitter 24. The second light portion 46 moves along a reference light path 50. In moving along the reference light path 50, the second portion 46 passes through a delay line 52. The second portion 46 is then reflected by a reference mirror 54. A reference reflection 56 of the second light portion 46 returns along the reference light path 50, passing again through the delay line 52. When the reference reflection 56 reaches the beam splitter 24, a reference reflection portion 58 passes through the beam splitter 24, and proceeds through the imaging focus lens 39 and to the imager 40. A discarded reference reflection portion 60 is reflected by the beam splitter 24. The discarded reference reflection portion 60 proceeds in the direction as the discarded image portion 42, and plays no further role in operation of the imaging system 10.

Images from the object 32 may reach the imager 40 with light traveling any of a variety of distances around the imaging light path 30. However, only that light traveling at substantially the same distance as that of the reference light path 50 contributes to imaging at the imager 40. More precisely, only light along the imaging light path 30 that has traveled for the same amount of time as light traveling along the reference light path 50 contributes to the making of the image at the imager 40. Light at all other distances along the imaging light path 30 is incoherently mixed with other light traveling on the reference light path 50. That incoherent mixing causes light from these other light paths to cancel out and not register at the imager 40. The depth and field at the imaging plane 34 is approximately equal to the coherence length of the light 14 from the low coherence light source 12. This mixing of the return image 36 with the reference reflection 56 allows imaging of a narrow field of view at an appreciable distance from the imaging system 10.

The imager 40 may be a charge-coupled device (CCD) or other known image devices. The delay line 52 may be a series of mirrors and/or one or more fiber optic devices. The delay line 52 can either have a fixed or variable delay. A variable delay may be effected by tilting mirrors of the delay line 52 so as to change the optical path, or by directing the second light portion 56 and/or the reference reflection 56 into different optical fiber devices, to give two examples.

The reference mirror 54 may either be fixed or movable. Having the reference mirror 54 movable allows changing the length of the reference light path 50, which changes the location of the imaging plane 34 relative to the imaging system 10.

From the foregoing it can be seen that relative movement may be effected between imaging system 10 and the object 32 to successively image various planes of the object 32. In doing so the imaging plane 34 is successively located over different planes of the object 32. One way of accomplishing relative movements of the imaging plane 34 over the object 32 is to change the delay in the delay line 52 and/or the location of the reference mirror 54, thereby changing the time traveled along the reference path 50. The object 32 may also be moved to thereby move the imaging plane 34 across different planes of the object 32. An example of moving of the object 32 relative to a stationary imaging system is in having a person walk through a security checkpoint or through a given doorway where the imaging plane 34 is located.

As another alternative the delay line 52 may have a series of different time delays that allow imaging of multiple imaging planes at the same time. Multiple signals may be received in such multi plane imaging at the same time or at different times. Computational methods may be used to differentiate between the signals at different distances.

The imaging system 10 may be able to image large objects, for example objects having a dimension of 10 cm or greater within the imaging plane 34. The imaging system 10 may also be able to image at long distances, for example with the imaging plane 34 being located at 10 cm or greater away from the imaging system 10.

An optical coherence interferometry system uses propagation invariance to improve range. It does not respond directly to interference and counter measures, which only add noise. An imaging system using optical coherence interferometry may achieve resolutions of 1 mm or less at very long ranges, such as ranges from 10 cm to as much as 20 km in the atmosphere. In a vacuum, resolution on the order of 1-μm may be possible.

Atmospheric jitter due to temperature differences in the atmosphere effecting optical path link, may affect the resolution of the imaging system 10. The atmospheric range jitter limits range resolution at long ranges and short wavelengths to on the order of 1-mm. this effect is missing in space and vacuum applications. The atmospheric jitter functional form is:

$$\sigma_{RMS} = 5.1 L_0^{5/6} \sqrt{\int_0^L C_n^2(\xi) d\xi} \tag{1}$$

where $L_0$ is the outer scale of turbulence, L is the target distance, and $C_n^2$ is the turbulence strength along the beam path. The effect of such jitter is described in Gardner, C. S. "Effects of random path fluctuations on the accuracy of laser ranging systems," *Applied Optics,* 1976, vol. 15, no. 10, pp. 2539-2545.

FIG. 2 shows an alternative configuration imaging system 10'. In the imaging system 10' additional optics 66 are placed between the beam splitter 24 and the imaging plane 34. The additional optics are magnifying optics having a pair of lenses 68 and 70. The additional optics 66 spread the first light portion 26, and focus the return image 36. Additional optics 66 allow use of components smaller than that of the object 32 or of the area to be imaged by the imaging plane 34. Using the image system 10 the beam splitter 24 and other components of the imaging system may be smaller than the area to be imaged by a factor of 10 or more.

The low coherence light source may be a laser, superluminescent diode, or other source that is suitably small in physical size. Low cost laser diodes typically have a coherence length on the order of one millimeter. For applications that desire the use of a specialized laser whose coherence length is too long, the bandwidth may be increased by the use of photonic crystal fiber devices, such as a commercial nonlinear supercontinuum device, the FEMTOWHITE 800, marketed by Crystal Fiber A/S of Birkerod, Denmark.

Figure 3:
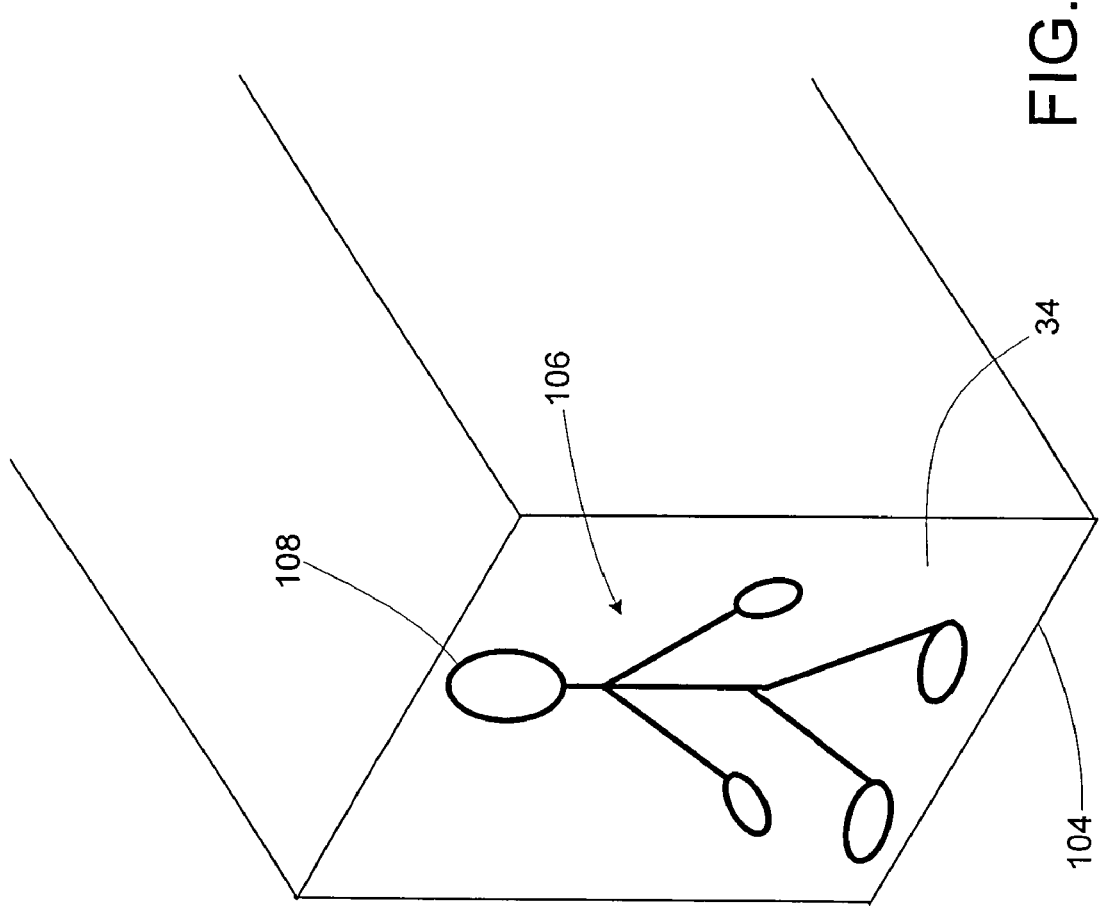
FIG. 3 is a diagram of a face recognition system utilizing an imaging system as shown in FIG. 1 or 2.
Figure 3:
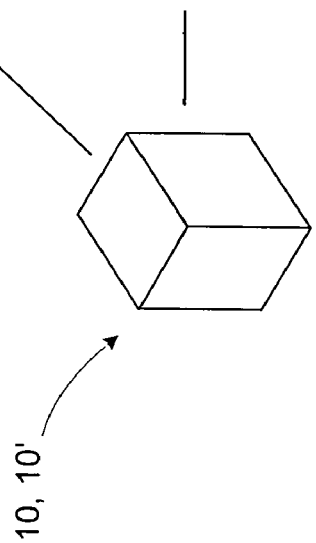

FIG. 3 shows one example of use of the imaging systems 10 and 10', as part of a face recognition system 100. The imaging system 10 or 10' is located so as to place the imaging plane 34 in a doorway 104 or other suitable locations, such as a given location along a corridor or walkway. A person 106 walks through the doorway 104 or other suitable location. As a head 108 of the person 106 passes through the imaging plane 34, images are taken successive planes of the head 108. This allows characterization of a face of the person 106 in three dimensions. The imaging information about the face can be stored and/or compared with information in a database. This comparison may be used to identify the person 106. The identification may be used for any of a wide variety of purposes, such as for entry into a secure area, for permission to board an aircraft, or other uses.

It will be appreciated that the imaging systems described above may be used in a wide variety of other tasks and applications. Imaging of relatively large objects (having dimensions of 10 cm or more) may be useful in a variety of processes involving recognition, analysis, or other quantification.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An imaging system comprising:
    a low-coherence light source;
    a delay line;
    a mirror;
    an imager;
    a beam splitter; and
    optics between the low-coherence light source and the beam splitter that increase size of a low-coherence light beam emerging from the low-coherence light source;
    wherein the beam splitter is placed in a light path of low-coherence light from the coherence light beam emerging from the light source, dividing the low-coherence light into an outgoing low-coherence light portion and a reference low-coherence light portion;
    wherein the outgoing low-coherence light portion is directed toward an object to be imaged;
    wherein at least part of return low-coherence light from the object is directed by the beam splitter to the imager;
    wherein the reference low-coherence light portion passes through the delay line and is reflected by the mirror to the imager;
    wherein the light from the light source has a coherence length on the order of 1 mm;
    wherein the imaging system images objects at an imaging plane; and
    wherein the imaging plane has a depth on the order of the coherence length of the light from the light source.

2. The system of claim 1, wherein the imaging system is capable of imaging objects at least 10 cm in size.

3. The system of claim 1, wherein the imaging system is capable of imaging objects at an imaging plane at least 10 cm from the imaging system.

4. The system of claim 1,
    wherein the imaging system images objects at an imaging plane; and
    wherein a roundtrip distance between the beam splitter and the imaging plane is substantially the same as a reference distance traveled within the system by the reference light portion.

5. The system of claim 1, wherein the imager is a charge-coupled device (CCD).

6. The system of claim 1, wherein the mirror is a variable-position mirror.

7. The system of claim 1, wherein the delay line includes an optical fiber device.

8. The system of claim 1, wherein the delay line includes a series of mirrors.

9. The system of claim 1, wherein the delay line is a variable-delay device.

10. The system of claim 1, further comprising magnifying optics downstream of the beam splitter for magnifying the outgoing portion of the light.

11. The system of claim 1, as part of a face recognition system.

12. The imaging system of claim 1, wherein the optics includes a first lens and a second lens, acting in series on the low-coherence light beam.

13. A method of imaging an object, the method comprising:
    directing an outgoing low-coherence light portion of low-coherence light from an imaging system toward an imaging plane;
    routing a reference low-coherence light portion of the low-coherence light through a reference path within the imaging system; and
    directing to an imager of the system both the reference low-coherence light portion and return low-coherence light produced by one or more objects in a light path of the outgoing light portion;
    wherein the imaging plane is located at a distance away from the imaging system that corresponds to a reference path length of the reference path;
    wherein the imaging plane is at least 10 cm away from the imaging system; and
    wherein the imaging plane has a depth on the order of a coherence length of the low-coherence light; and
    wherein the coherence length is on the order of 1 mm.

14. The method of claim 13, further comprising moving the imaging plane, relative to the imaging system, by changing the reference path length of the reference path.

15. The method of claim 13, further comprising moving at least one of the imaging plane and the object, in order to image multiple planes of the object.

16. The method of claim 15, wherein the moving includes moving the imaging plane, relative to the imaging system, by changing the reference path length of the reference path.

17. The method of claim 15, wherein the moving includes moving the object.

18. The method of claim 13, wherein the directing the outgoing light portion includes passing the outgoing light portion through magnifying optics to enable imaging of objects larger than other parts of the imaging system.

19. The method of claim 13, wherein the imaging plane is at least 20 km away from the imaging system.

* * * * *